(12) United States Patent
Hayasaka et al.

(10) Patent No.: US 11,667,274 B2
(45) Date of Patent: Jun. 6, 2023

(54) CONTROL APPARATUS FOR VEHICLE

(71) Applicant: TOYOTA JIDOSHA KABUSHIKI KAISHA, Toyota (JP)

(72) Inventors: Akihito Hayasaka, Nisshin (JP); Nobufusa Kobayashi, Kazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 17/176,317

(22) Filed: Feb. 16, 2021

(65) Prior Publication Data

US 2021/0291807 A1 Sep. 23, 2021

(30) Foreign Application Priority Data

Mar. 17, 2020 (JP) .............................. JP2020-047002

(51) Int. Cl.
*B60W 20/11* (2016.01)
*B60W 20/40* (2016.01)
(Continued)

(52) U.S. Cl.
CPC ............ *B60W 20/40* (2013.01); *B60W 10/02* (2013.01); *B60W 10/06* (2013.01); *B60W 10/08* (2013.01); *B60W 20/11* (2016.01); *B60W 2510/0208* (2013.01); *B60W 2510/0241* (2013.01); *B60W 2510/0638* (2013.01);
(Continued)

(58) Field of Classification Search
CPC .... B60W 20/40; B60W 20/10; B60W 201/13; B60W 2510/0208; B60W 2510/083; B60W 10/02; B60W 10/06; B60W 10/08; B60W 2710/083; B60W 2510/244; B60W 2510/0241; B60W 2510/1015; B60W 2540/10
See application file for complete search history.

(56) References Cited

U.S. PATENT DOCUMENTS

2018/0009433 A1\* 1/2018 Johri ..................... F02D 41/065
2018/0162347 A1\* 6/2018 Meyer ................... B60K 6/547
(Continued)

FOREIGN PATENT DOCUMENTS

| JP | 2012-530012 A | 11/2012 |
| JP | 2015-51707 A | 3/2015 |
| JP | 2015-93667 A | 5/2015 |

*Primary Examiner* — Roger L Pang
(74) *Attorney, Agent, or Firm* — Oblon, McClelland, Maier & Neustadt, L.L.P.

(57) ABSTRACT

A control apparatus for a vehicle that includes an engine, an electric motor, a clutch for separating connection between the engine and the electric motor, and a fluid-type transmission device including a lockup clutch and transmitting drive powers of the engine and the electric motor to drive wheels. The control apparatus includes (a) a portion configured, during motor running of the vehicle with the clutch being released, to calculate a predicted value of a rotational speed of the electric motor, depending on an operation state of the lockup clutch; (b) a portion configured to calculate a predicted value of an outputtable maximum torque of the electric motor, by using the predicted value of the rotational speed of the electric motor; (c) a portion configured to determine whether start of the engine is requested or not, by using the predicted value of the outputtable maximum torque of the electric motor.

13 Claims, 7 Drawing Sheets

(51) Int. Cl.
*B60W 10/02* (2006.01)
*B60W 10/06* (2006.01)
*B60W 10/08* (2006.01)

(52) U.S. Cl.
CPC .............. *B60W 2510/083* (2013.01); *B60W 2510/1015* (2013.01); *B60W 2510/244* (2013.01); *B60W 2540/10* (2013.01); *B60W 2710/083* (2013.01)

(56) References Cited

U.S. PATENT DOCUMENTS

2019/0047549 A1* 2/2019 Johri ........................ B60K 6/38
2019/0143961 A1* 5/2019 Meyer .................. B60W 10/02
701/22

\* cited by examiner

CONTROL APPARATUS FOR VEHICLE

This application claims priority from Japanese Patent Application No. 2020-047002 filed on Mar. 17, 2020, the disclosure of which is herein incorporated by reference in its entirety.

FIELD OF THE INVENTION

The present invention relates to a control apparatus for a vehicle that includes an engine, drive wheels, an electric motor, a clutch configured to separate connection of the engine and the electric motor when the clutch is released, and a fluid-type transmission device including a lockup clutch and configured to transmit a drive power of the engine and/or a drive power of the electric motor to the drive wheels.

BACKGROUND OF THE INVENTION

There is well-known a control apparatus for a vehicle that includes (i) an engine, (ii) drive wheels, (iii) an electric motor provided in a power transmission path between the engine and the drive wheels and connected to the engine and the drive wheels in a power transmittable manner, (iv) a clutch provided in the power transmission path, and configured to separate connection between the engine and the electric motor when the clutch is released, and (v) a fluid-type transmission device including a lockup clutch and constituting a part of the power transmission path so as to transmit a drive power of the engine and/or a drive power of the electric motor to the drive wheels. A control apparatus for a hybrid vehicle described in JP2015-51707A is an example of such a control apparatus. This Japanese Patent Application Publication discloses that motor running of the vehicle is performed with the clutch being released when a requested drive torque can be covered by only an output of the electric motor, and further discloses an engine start method that is executed when start of the engine is requested as a result of increase of the requested drive torque during the motor running, wherein the engine start method is executed by cranking the engine, with the clutch being controlled to provide a torque capacity by which a torque required to start the engine is to be transmitted to the engine. Further, in the disclosed engine start method, the electric motor is controlled to generate, in addition to a torque used as the drive torque by which the motor running is performed, an additional torque for cancelling a reaction torque generated by the cranking of the engine upon engagement of the clutch, so as to suppress reduction of the drive torque. From another point of view, this Japanese Patent Application Publication teaches a need to assure the additional torque required for the start of the engine, in preparation for the start of the engine during the motor running, so as to cancel the reaction torque generated by the cranking of the engine.

SUMMARY OF THE INVENTION

By the way, an outputtable maximum torque of the electric motor is dependent on a rotational speed of the electric motor. Further, in a case in which the lockup clutch is in a released state, as compared with in a case in which the lockup clutch is in an engaged state, an input torque inputted to the fluid-type transmission device is likely to be fluctuated whereby the rotational speed of the electric motor is likely to be largely fluctuated. Therefore, even when the start of the engine is initiated with the above-described additional torque being assured for cancelling the reaction torque generated by the cranking of the engine upon engagement of the clutch, if the outputtable maximum torque of the electric motor is reduced as a result of increase of the rotational speed of the electric motor, in process of the start of the engine, there is a risk that the additional torque required for cancelling the reaction torque, namely, the additional torque required for the start of the engine, could not be assured whereby drivability of the vehicle could be reduced.

The present invention was made in view of the background art described above. It is therefore an object of the present invention to provide a control apparatus for a vehicle, which is capable of suppressing reduction of drivability of the vehicle by making it easy to assure an electric motor torque required to start the engine upon start of the engine, i.e., in process of the start of the engine.

The object indicated above is achieved according to the following aspects of the present invention.

According to a first aspect of the invention, there is provided a control apparatus for a vehicle that includes (i) an engine, (ii) drive wheels, (iii) an electric motor provided in a power transmission path between the engine and the drive wheels and connected to the engine and the drive wheels in a power transmittable manner, (iv) a clutch provided in the power transmission path, and configured to separate connection between the engine and the electric motor when the clutch is released, and (v) a fluid-type transmission device including a lockup clutch and constituting a part of the power transmission path so as to transmit a drive power of the engine and/or a drive power of the electric motor to the drive wheels. The control apparatus comprises: (a) an electric-motor rotational-speed prediction portion that is configured, during motor running of the vehicle by the drive power of the electric motor with the clutch being released, to calculate a predicted value of a rotational speed of the electric motor, by anticipating change of the rotational speed of the electric motor, depending on an operation state of the lockup clutch; (b) an electric-motor torque prediction portion that is configured to calculate a predicted value of an outputtable maximum torque of the electric motor, by using the predicted value of the rotational speed of the electric motor; (c) an engine-start-request determination portion that is configured to determine whether start of the engine is requested or not, by using the predicted value of the outputtable maximum torque of the electric motor; and (d) an engine-start control portion that is configured, when it is determined that the start of the engine is requested, to start the engine by causing the electric motor to output a required starting torque required to start the engine while causing the clutch to be engaged.

According to a second aspect of the invention, in the control apparatus according to the first aspect of the invention, the electric-motor rotational-speed prediction portion is configured, in a case in which the lockup clutch is in a released state, to calculate the predicted value of the rotational speed of the electric motor, based on an output rotational speed of the fluid-type transmission device, a requested drive amount of the vehicle requested by a driver of the vehicle and an operation characteristic of the fluid-type transmission device.

According to a third aspect of the invention, in the control apparatus according to the first or second aspect of the invention, the electric-motor rotational-speed prediction portion is configured, in a case in which the lockup clutch is in an engaged state, to calculate, as the predicted value of the rotational speed of the electric motor, a sum of an output rotational speed of the fluid-type transmission device and a slip rotational speed of the lockup clutch in process of the start of the engine.

According to a fourth aspect of the invention, in the control apparatus according to any one of the first through third aspects of the invention, the vehicle further includes an electrical storage device configured to supply and receive an electric power to and from the electric motor, wherein the electric-motor torque prediction portion is configured to calculate the predicted value of the outputtable maximum torque of the electric motor, based on a limitation of output from the electrical storage device and the predicted value of the rotational speed of the electric motor.

According to a fifth aspect of the invention, in the control apparatus according to any one of the first through fourth aspects of the invention, the engine-start-request determination portion is configured to determine whether the start of the engine is requested or not, depending on whether a requested drive amount of the vehicle requested by a driver of the vehicle has exceeded an engine-start determination value that is obtained by subtracting the required starting torque from the predicted value of the outputtable maximum torque of the electric motor.

According to a sixth aspect of the invention, in the control apparatus according to the fifth aspect of the invention, the engine-start control portion is configured, when it is determined that the start of the engine is requested, to set an upper limit of the requested drive amount, to the engine-start determination value at a point of time at which it is determined that the start of the engine is requested, and to keep the upper limit of the requested drive amount in a period until the start of the engine is completed.

According to a seventh aspect of the invention, in the control apparatus according to any one of the first through fourth aspects of the invention, the engine-start-request determination portion is configured to determine whether the start of the engine is requested or not, depending on whether a requested drive amount of the vehicle requested by a driver of the vehicle has exceeded an engine-start determination value that is obtained by subtracting a sum of the required starting torque and a margin amount of the outputtable maximum torque from the predicted value of the outputtable maximum torque of the electric motor, wherein the margin amount of the outputtable maximum torque is dependent on accuracy of calculation of the predicted value of the rotational speed of the electric motor.

According to an eighth aspect of the invention, in the control apparatus according to the seventh aspect of the invention, the engine-start control portion is configured, when it is determined that the start of the engine is requested, to set an upper limit of the requested drive amount, to a sum of the margin amount of the outputtable maximum torque and the engine-start determination value at a point of time at which it is determined that the start of the engine is requested, and to keep the upper limit of the requested drive amount in a period until the start of the engine is completed.

In the control apparatus according to the first aspect of the invention, during the motor running, the predicted value of the rotational speed of the electric motor is calculated by anticipating possible change of the rotational speed of the electric motor (that could be caused from a current point of time), depending on the operation state of the lockup clutch, and the predicted value of the outputtable maximum torque of the electric motor, by using the predicted value of the rotational speed of the electric motor. Then, it is determined whether the start of the engine is requested or not, by using the predicted value of the outputtable maximum torque of the electric motor. Owing to this control arrangement, even if the outputtable maximum torque of the electric motor is made lower in future than the outputtable maximum torque at a point of time at which the start of the engine is initiated, it is possible to initiate the start of the engine in a state facilitating assurance of a torque of the electric motor that is required to cancel a reaction torque generated as a result of cranking of the engine upon engagement of the clutch in the process of the start of the engine. Thus, the electric motor torque required to start the engine is easily assured upon the start of the engine, namely, in the process of the start of the engine, thereby making it possible to suppress reduction of a drivability of the vehicle.

In the control apparatus according to the second aspect of the invention, in the case in which the lockup clutch is in the released state, the predicted value of the rotational speed of the electric motor is calculated, based on the output rotational speed of the fluid-type transmission device, the requested drive amount of the vehicle requested by the driver of the vehicle and the operation characteristic of the fluid-type transmission device, so that the predicted value of the rotational speed of the electric motor is appropriately calculated, by using the predicted value of the rotational speed of the electric motor in the released state of the lockup clutch. Owing to this control arrangement, it is possible to initiate the start of the engine in the state facilitating assurance of the torque of the electric motor that is required to cancel the reaction torque in the process of the start of the engine, even in the released state of the lockup clutch in which the outputtable maximum torque of the electric motor is likely to be reduced by increase of the rotational speed of the electric motor in the process of the start of the engine.

In the control apparatus according to the third aspect of the invention, in the case in which the lockup clutch is in the engaged state, the sum of the output rotational speed of the fluid-type transmission device and the slip rotational speed of the lockup clutch in process of the start of the engine is calculated as the predicted value of the rotational speed of the electric motor, so that the predicted value of the rotational speed of the electric motor is appropriately calculated, by using the predicted value of the rotational speed of the electric motor in the engaged state of the lockup clutch. Owing to this control arrangement, it is possible to initiate the start of the engine in the state facilitating assurance of the torque of the electric motor that is required to cancel the reaction torque in the process of the start of the engine, even in the engaged state of the lockup clutch in which the lockup clutch is slipped in the process of the start of the engine.

In the control apparatus according to the fourth aspect of the invention, the predicted value of the outputtable maximum torque of the electric motor is calculated based on the predicted value of the rotational speed of the electric motor and the limitation of the output from the electrical storage device, so that the predicted value of the outputtable maximum torque of the electric motor can be appropriately calculated.

In the control apparatus according to the fifth aspect of the invention, it is determined whether the start of the engine is requested or not, depending on whether the requested drive amount has exceeded the engine-start determination value that is obtained by subtracting the required starting torque from the predicted value of the outputtable maximum torque of the electric motor. Owing to this control arrangement, it is possible to appropriately initiate the start of the engine in the state facilitating assurance of the torque of the electric motor that is required to cancel the reaction torque in the process of the start of the engine.

In the control apparatus according to the sixth aspect of the invention, when it is determined that the start of the engine is requested, the upper limit of the requested drive amount is set to the engine-start determination value at the point of time at which it is determined that the start of the engine is requested, and the upper limit of the requested drive amount is kept in the period until the start of the engine is completed. Owing to this control arrangement, it is possible to execute the start of the engine in the state facilitating assurance of the torque of the electric motor that is required to cancel the reaction torque in the process of the start of the engine, even if the actual requested drive amount is made larger than at the point of time at which it is determined that the start of the engine is requested.

In the control apparatus according to the seventh aspect of the invention, it is determined whether the start of the engine is requested or not, depending on whether the requested drive amount has exceeded the engine-start determination value that is obtained by subtracting the sum of the required starting torque and the margin amount of the outputtable maximum torque from the predicted value of the outputtable maximum torque of the electric motor, wherein the margin amount of the outputtable maximum torque is dependent on accuracy of the calculation of the predicted value of the rotational speed of the electric motor. Owing to this control arrangement, it is possible to appropriately initiate the start of the engine in the state facilitating assurance of the torque of the electric motor that is required to cancel the reaction torque in the process of the start of the engine.

In the control apparatus according to the eighth aspect of the invention, when it is determined that the start of the engine is requested, the upper limit of the requested drive amount is set to the sum of the margin amount of the outputtable maximum torque and the engine-start determination value at the point of time at which it is determined that the start of the engine is requested, and the upper limit of the requested drive amount is kept in the period until the start of the engine is completed. Owing to this control arrangement, it is possible to execute the start of the engine in the state facilitating assurance of the torque of the electric motor that is required to cancel the reaction torque in the process of the start of the engine, and to cause the upper limit of the requested drive amount to be made larger by an amount corresponding to the margin amount of the outputtable maximum torque of the electric motor.

DETAILED DESCRIPTION OF PREFERRED EMBODIMENTS

Hereinafter, preferred embodiments of the invention will be described in detail with reference to the accompanying drawings.

First Embodiment

Figure 1:
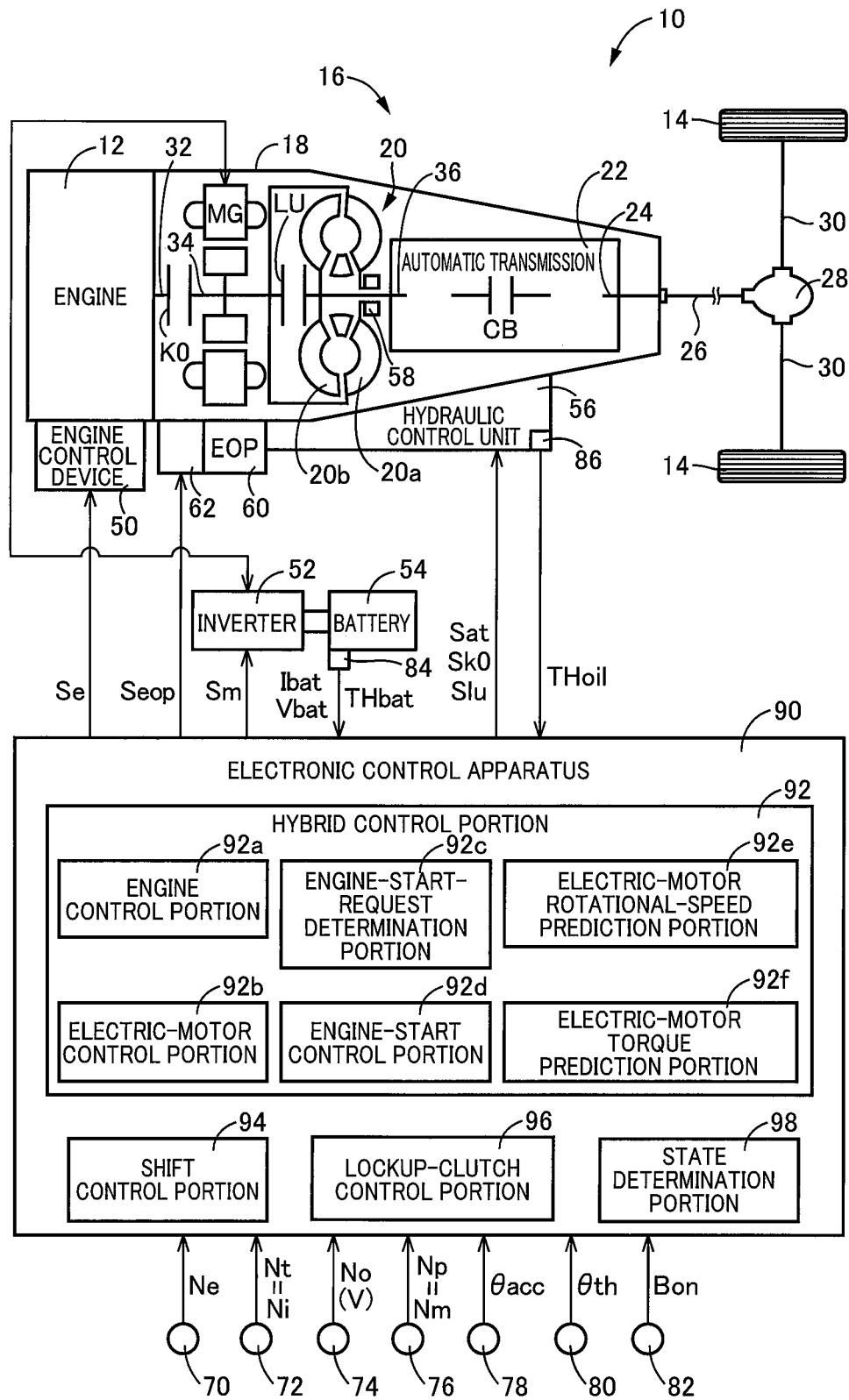
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is a hybrid vehicle including an engine 12 and an electric motor MG serving as drive power source by which the vehicle 10 is to be driven to run. The vehicle 10 further includes driven wheels 14 and a power transmission apparatus 16 that is provided in a power transmission path between the engine 12 and the drive wheels 14.

The power transmission apparatus 16 includes a casing 18 as a non-rotary member that is attached to a body of the vehicle 10, a connecting/disconnecting clutch K0 provided in the power transmission path between the engine 12 and the drive wheels 14, a torque converter 20 connected to the engine 12 through the connecting/disconnecting clutch K0 and an automatic transmission 22 connected to the torque converter 20. The connecting/disconnecting clutch K0, electric motor MG torque converter 20 and automatic transmission 22 are disposed inside the casing 18. The torque converter 20 and the automatic transmission 22 constitute respective parts of the power transmission path between the engine 12 and the drive wheels 14. The automatic transmission 22 is disposed in a power transmission path between the torque converter 20 and the drive wheels 14. The power transmission apparatus 16 further includes a propeller shaft 26 connected to a transmission output shaft 24 that is an output rotary member of the automatic transmission 22, a differential gear device 28 connected to the propeller shaft 26, and a pair of drive shafts 30 connected to the differential gear device 28. The power transmission apparatus 16 still further includes an engine connection shaft 32 connecting between the engine 12 and the connecting/disconnecting clutch K0, and an electric-motor connection shaft 34 connecting between the connecting/disconnecting clutch K0 and the torque converter 20.

The electric motor MG is connected to the electric-motor connection shaft 34 in a power transmittable manner in the casing 18. The electric motor MG is disposed in the power transmission path between the engine 12 and the drive wheels 14, so as to be connected to the engine 12 and the drive wheels 14 in a power transmittable manner, more specifically, the electric motor MG is disposed in a power transmission path between the connecting/disconnecting clutch K0 and the torque converter 20, so as to be connected to the connecting/disconnecting clutch K0 and the torque converter 20 in a power transmittable manner. That is, the electric motor MG is connected to the torque converter 20 and the automatic transmission 22 without through the connecting/disconnecting clutch K0 in a power transmittable manner. From another point of view, the torque converter 20 and the automatic transmission 22 constitute respective parts of a power transmission path between the electric motor MG and the drive wheels 14. The torque converter 20 and the automatic transmission 22 transmit a drive power of the engine 12 and/or a drive power of the electric motor MG to the drive wheels 14.

The torque converter 20 includes a pump impeller 20a connected to the electric-motor connection shaft 34, and a turbine impeller 20b connected to a transmission input shaft 36 that is an input rotary member of the automatic transmission 22. The pump impeller 20a is connected to the engine 12 through the connecting/disconnecting clutch K0, and is connected directly to the electric motor MG The pump impeller 20a is an input member of the torque converter 20, while the turbine impeller 20b is an output member of the torque converter 20. The electric-motor connection shaft 34 serves also as an input rotary member of the torque converter 20. The transmission input shaft 36 serves also as an output rotary member of the torque converter 20, which is formed integrally with a turbine shaft that is to be rotated by the turbine impeller 20b. The torque converter 20 is a fluid-type transmission device, and is configured to transmit the drive powers of the drive power sources in the form of the engine 12 and the electric motor MG; to the transmission input shaft 36, through fluid circulating in the torque converter 20.

When the connecting/disconnecting clutch K0 is engaged, the pump impeller 20a and the engine 12 are to be rotated integrally with each other through the engine connection shaft 32. That is, the connecting/disconnecting clutch K0 connects between the engine 12 and the drive wheels 14 in a power transmittable manner, when being engaged. On the other hand, when the connecting/disconnecting clutch K0 is released, transmission of a power between the engine 12 and the pump impeller 20a is interrupted. That is, the connecting/disconnecting clutch K0 separates connection between the engine 12 and the drive wheels 14, when being released. The connecting/disconnecting clutch K0 is disposed in the power transmission path between the engine 12 and the electric motor MG that is connected to the pump impeller 20a, and serves as a clutch configured to cut off the power transmission path between the engine 12 and the electric motor MG namely, to disconnect the engine 12 from the electric motor MG That is, the connecting/disconnecting clutch K0 is a clutch configured to connect between the engine 12 and the electric motor MG; when being engaged, and to separate the connection between the engine 12 and the electric motor MG; when being released.

In the power transmission apparatus 16, the power outputted from the engine 12 is transmitted, when the connecting/disconnecting clutch K0 is engaged, to the drive wheels 14 from the engine connection shaft 32 through sequentially the connecting/disconnecting clutch K0, electric-motor connection shaft 34, torque converter 20, automatic transmission 22, propeller shaft 26, differential gear device 28 and drive shafts 30, for example. Further, the power transmitted from the electric motor MG is transmitted, irrespective of the operation state of the connecting/disconnecting clutch K0, to the drive wheels 14 from the electric-motor connection shaft 34 through sequentially the torque converter 20, automatic transmission 22, propeller shaft 26, differential gear device 28 and drive shafts 30, for example. The power corresponds to a torque and a force unless they are to be distinguished from one another.

The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 12, is controlled.

The electric motor MG is a rotating electric machine having a function serving as a motor configured to generate a mechanical power from an electric power and a function serving as a generator configured to generate an electric power from a mechanical power. That is, the electric motor MG is a so-called "motor generator". The electric motor MG is connected to a battery 54 provided in the vehicle 10, through an inverter 52 provided in the vehicle 10. The inverter 52 is controlled by the electronic control apparatus 90 whereby a motor torque Tm as an output torque of the electric motor MG is controlled. The motor torque Tm serves as a power running torque when acting as a positive torque for acceleration, with the electric motor MG being rotated in a forward direction that is the same as a direction of rotation of the engine 12 during operation of the engine 12. The motor torque Tm serves as a regenerative torque when acting as a negative torque for deceleration, with the electric motor MG being rotated in the forward direction. Specifically, the electric motor MG receives the electric power from the battery 54 through the inverter 52, and generates the power for running the vehicle 10, in place of or in addition to the engine 12. Further, the electric motor MG generates the electric power based on the power of the engine 12 or a driven power transmitted from the drive wheels 14. The electric power generated by the electric motor MG is supplied to the battery 54 though the inverter 52 so as to be stored in the battery 54. The battery 54 is an electric storage device to and from which the electric power is supplied from and to the electric motor MG. The electric power corresponds to an electric energy unless they are to be distinguished from each other.

The automatic transmission 22 is a known automatic transmission of a planetary gear type which includes at least one planetary gear device and a plurality of engagement devices CB. Each of the engagement devices C is a hydraulically-operated frictional engagement device in the form of a multiple-disc type or a single-disc type clutch or brake that is to be pressed by a hydraulic actuator, or a band brake that is to be tightened by a hydraulic actuator. Each of the engagement devices CB receives a regulated hydraulic pressure supplied from a hydraulic control unit (hydraulic control circuit) 56 that is provided in the vehicle 10, whereby its engaging torque, i.e., torque capacity is changed and its operation state is switched between an engaged state and a released state, for example.

The automatic transmission 22 is a step-variable automatic transmission configured to establish a selected one of a plurality of gear positions, with a corresponding one or ones of the engagement devices CB being engaged, wherein the gear positions are different from each other in gear ratio (speed ratios) γat (=AT input rotational speed Ni/AT output rotational speed No). The automatic transmission 22 is configured to switch from one of the AT gear positions to another one of the AT gear positions, namely, to establish one of the AT gear positions which is selected, by the electronic control apparatus 90, depending on, for example, an accelerating operation made by a vehicle driver (operator) and the vehicle running speed V. The AT input rotational speed Ni is a rotational speed of the transmission input shaft 36, and is an input rotational speed of the automatic transmission 22. The AT input rotational speed Ni is also a rotational speed of the output rotary member of the torque converter 20, and is equal to a turbine rotational speed Nt that is an output rotational speed of the torque converter 20. Therefore, the AT input rotational speed Ni can be represented by the turbine rotational speed Nt. The AT output rotational speed No is a rotational speed of the transmission output shaft 24, and is an output rotational speed of the automatic transmission 22.

The connecting/disconnecting clutch K0 is a hydraulically-operated frictional engagement device in the form of a multiple-disc type or a single-disc type clutch that is to be pressed by a hydraulic actuator, for example. The connecting/disconnecting clutch K0 receives a regulated K0 hydraulic pressure supplied from the hydraulic control unit 56, whereby a K0 clutch torque Tk0, i.e., torque capacity of the connecting/disconnecting clutch K0 is changed and its operation state is switched.

The torque converter 20 includes a direct connection clutch in the form of a lockup clutch LU configured to connect between the pump impeller 20a and the turbine impeller 20b, namely, to connect between the input and output rotary members of the torque converter 20. That is, the torque converter 20 is a fluid-type transmission device including the lockup clutch LU. The lockup clutch LU receives a regulated LU hydraulic pressure supplied from the hydraulic control unit 56, whereby a LU clutch torque Tlu, i.e., torque capacity of the lockup clutch LU is changed and its operation state is switched.

As the operation state of the lockup clutch LU, there are a fully released state in which the lockup clutch LU is fully released, a slipped state in which the lockup clutch LU is engaged with slipping, and a fully engaged state in which the lockup clutch LU is fully engaged. With the lockup clutch LU being placed in the fully engaged state, the torque converter 20 is placed in a lockup state in which the pump impeller 20a and the turbine impeller 20b are rotated integrally with each other. When the torque converter 20 is in the lockup state, the power or powers of the engine 12 and/or the electric motor MG as the drive power sources are transmitted to the transmission input shaft 36 without through the fluid circulating within the torque converter 20. When the lockup clutch LU is placed in the slipped state, the lockup clutch LU is slipped such that a slip amount Nslp in the lockup clutch LU becomes a target slip amount Nslptgt. The slip amount Nslp corresponds to a slip rotational speed of the lockup clutch LU, which is an input/output rotational speed difference of the lockup clutch LU, i.e., a differential rotational speed (=pump rotational speed Np—turbine rotational speed Nt) of input and output rotary members of the lockup clutch LU. For example, in a driving state of the vehicle 10, with the lockup clutch LU being placed in the slipped state, a racing or blowing-up of the engine rotational speed Ne is suppressed as compared with in the fully released state, and a booming noise inside a vehicle is suppressed as compared with in the fully engaged state. The pump rotational speed Np is the input rotational speed of the torque converter 20, and is the rotational speed of the electric-motor connection shaft 34 that is the input rotary member of the torque converter 20. The pump rotational speed Np is equal to a motor rotational speed Nm that is the rotational speed of the electric motor MG. Therefore, the pump rotational speed Np can be represented by the motor rotational speed Nm. The engine rotational speed Ne is a rotational speed of the engine 12.

The vehicle 10 further includes an MOP 58 that is a mechanically-operated oil pump, an EOP 60 that is an electrically-operated oil pump, and a pump motor 62. The MOP 58 is connected to the pump impeller 20a, and is to be rotated and driven by the drive power source or sources (i.e., engine 12 and/or electric motor MG), so as to output a working fluid OIL that is to be used in the power transmission apparatus 16. The pump motor 62 is a motor serving exclusively to rotate and drive the EOP 60. The EOP 60 outputs the working fluid OIL, when being rotated and driven by the pump motor 62. The working fluid OIL outputted by the MOP 58 and the EOP 60 is supplied to the hydraulic control unit 56. The hydraulic control unit 56, which receives the working fluid OIL as an original hydraulic pressure, supplies regulated hydraulic pressures that serve as the hydraulic pressure of the engagement devices CB, the K0 hydraulic pressure and the LU hydraulic pressure. The working fluid OIL is used also as the fluid circulated within the torque converter 20.

The vehicle 10 is provided with the electronic control apparatus 90 as a controller including the control apparatus which is constructed according to the present invention and which is configured to control start of the engine 12, for example. The electronic control apparatus 90 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 90 may be constituted by two or more control units exclusively assigned to perform respective different control operations such as an engine control operation, an electric-motor control operation and a hydraulic-pressure control operation, as needed.

The electronic control apparatus 90 receives various input signals based on values detected by respective sensors provided in the vehicle 10. Specifically, the electronic control apparatus 90 receives: an output signal of an engine speed sensor 70 indicative of the engine rotational speed Ne; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of a motor speed sensor 76 indicative of the motor rotational speed Nm that is equal to the pump rotational speed Np; an output signal of an accelerator-opening degree sensor 78 indicative of an accelerator opening degree (accelerator operation degree) θacc representing an amount of accelerating operation made by the vehicle driver; an output signal of a throttle-opening degree sensor 80 indicative of a throttle opening degree θth which is an opening degree of an electronic throttle valve; an output signal of a brake switch 82 indicative of a signal representing a state in which a brake pedal is being operated by the vehicle driver so as to operate wheel brakes; an output signal of a battery sensor 84 indicative of a battery temperature THbat, a battery charging/discharging electric current That and a battery voltage Vbat; and an output signal of a fluid temperature sensor 86 indicative of a working-fluid temperature THoil that is a temperature of the working fluid OIL in the hydraulic control unit 56.

The electronic control apparatus 90 generates various output signals to the various devices provided in the vehicle 10, such as: an engine control command signal Se that is to be supplied to the engine control device 50 for controlling the engine 12, an electric-motor control command signal Sm that is to be supplied to the inverter 52 for controlling the electric motor MG; an AT hydraulic control command signal Sat that is to be supplied to the hydraulic control unit 56 for controlling the operation states of the engagement devices CB; a K0 hydraulic control command signal Sko that is to be supplied to the hydraulic control unit 56 for controlling the operation state of the connecting/disconnecting clutch K0; an LU hydraulic control command signal SLU that is to be supplied to the hydraulic control unit 56 for controlling the operation state of the lockup clutch LU; and an EOP control command signal Seop that is to be supplied to the pump motor 62 for controlling operation of the EOP 60.

For performing various control operations in the vehicle 10, the electronic control apparatus 90 includes a hybrid control means in the form of a hybrid control portion 92, a shift control means in the form of a shift control portion 94, and a lockup-clutch control means in the form of a lockup-clutch control portion 96.

The hybrid control portion 92 has a function serving as an engine control means in the form of an engine control portion 92a for controlling operation of the engine 12 and a function serving as an electric-motor control means in the form of an electric-motor control portion 92b for controlling operation of the electric motor MG through the inverter 52, and executes a hybrid-drive control operation, for example, using the engine 12 and the electric motor MG through these control functions.

The hybrid control portion 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem of the drive wheels 14. In the following description, the requested drive torque Trdem of the vehicle 10 requested by the vehicle driver will be referred to as "driver's requested torque Trdemd". From another point of view, the requested drive torque Trdem [Nm] is a requested drive power Prdem [W] at the current vehicle running speed V. As the requested drive amount, another value such as a requested drive power Frdem [N] of the drive wheels 14 and a requested AT output torque of the transmission output shaft 24 may be used, too. In the calculation of the requested drive amount, it is also possible to use, for example, the AT output rotational speed No in place of the vehicle running speed V.

The hybrid control portion 92 outputs the engine control command signal Se and the electric-motor control command signal Sm for controlling the engine 12 and the electric motor MG, respectively, such that the requested drive power Prdem is realized, by taking account of various factors such as a transmission loss, an auxiliary load, the gear ratio γat of the automatic transmission 22 and the maximum chargeable amount Win and maximum dischargeable amount Wout of the battery 54. The engine control command signal Se is, for example, a command value of an engine power Pe that is the power of the engine 12 outputting the engine torque Te at the current engine rotational speed Ne. The electric-motor control command signal Sm is, for example, a command value of a consumed electric power Wm of the electric motor MG outputting the motor torque Tm at the current motor rotational speed Nm.

The maximum chargeable amount Win of the battery 54 is a maximum amount of the electric power that can be charged to the battery 54, and represents a limitation of the electric power inputted to the battery 54, namely, a limitation of input to the battery 54. The maximum dischargeable amount Wout of the battery 54 is a maximum amount of the electric power that can be discharged from the battery 54, and represents a limitation of the electric power outputted from the battery 54, namely, a limitation of output of the battery 54. The maximum chargeable and dischargeable amounts Win, Wout are calculated by the electronic control apparatus 90, for example, based on the battery temperature THbat and a state-of-charge value SOC [%] of the battery 54. The state-of-charge value SOC of the battery 54 is a value indicative of a charged state of the battery 54, i.e., an amount of the electric power stored in the battery 54, and is calculated by the electronic control apparatus 90, for example, based on the charging/discharging electric current Ibat and the voltage Vbat of the battery 54.

When the requested drive torque Trdem is in a range that can be covered by only the output of the electric motor MG, the hybrid control portion 92 establishes a motor running (=EV running) mode as a running mode. When the EV running mode is established, the hybrid control portion 92 causes the vehicle 10 to perform an EV running (electric motor running) with the connecting/disconnecting clutch K0 being released and with only the electric motor MG serving as the drive power source. On the other hand, when the requested drive torque Trdem is in a range that cannot be covered without at least the output of the engine 12, the hybrid control portion 92 establishes another running mode that is an engine running mode, i.e., a hybrid running (=HV running) mode. When the HV running mode is established, the hybrid control portion 92 causes the vehicle 10 to perform an engine running, i.e., an HV running (hybrid running) with the connecting/disconnecting clutch K0 being engaged and with at least the engine 12 serving as the drive power source. Further, even when the requested drive torque Trdem is in the range that can be covered by only the output of the electric motor MG; the hybrid control portion 92 establishes the HV running mode, for example, in a case in which the state-of-charge value SOC of the battery 54 becomes less than a predetermined engine-start threshold value or in a case in which the engine 12 or other component needs to be warmed up. The engine-start threshold value is a predetermined threshold value for determining that the state-of-charge value SOC reaches a level at which the engine 12 must forcibly be started for charging the battery 54. Thus, the hybrid control portion 92 switches between the EV running mode and the HV running mode, based on, for example, the requested drive torque Trdem, by automatically stopping the engine 12 during the HV running, restarting the engine 12 after the stop of the engine 12, and staring the engine 12 during the EV running.

The hybrid control portion 92 has a function serving as an engine-start-request determination means in the form of an engine-start-request determination portion 92c configured to determine whether the start of the engine 12 is requested (required) or not. The engine-start-request determination portion 92c determines whether the start of the engine 12 is requested or not, for example, depending on (i) whether the requested drive torque Trdem has become larger than the range that can be covered by only the output of the electric motor MG; (ii) whether the the engine 12 or other component needs to be warmed up and (iii) whether the battery 54 needs to be charged.

The hybrid control portion 92 has a function serving as an engine-start control means in the form of an engine-start control portion 92d configured, when it is determined by the engine-start-request determination portion 92c that the start of the engine 12 is requested during the EV running mode, to execute an engine-start control operation for starting the engine 12. In execution of the engine-start control operation, the engine-start control portion 92d outputs the K0 hydraulic control command signal Sko for cranking the engine 12, by causing the connecting/disconnecting clutch K0 to be switched from its released state to its engaged state so as to have the K0 clutch torque Tk0 for transmitting, to the engine 12, a torque required to start the engine 12. Further, in connection with the cranking of the engine 12, the engine-start control portion 92d outputs the engine control command signal Se for starting a fuel supply and an engine ignition. The K0 hydraulic control command signal Sko and the engine control command signal Se, which are outputted by the hybrid control portion 92, are supplied to the engine control device 50. The above-described torque required to start the engine 12 corresponds to an engine-start reaction torque Trfst that is a reaction torque generated as a result of the engagement of the connecting/disconnecting clutch K0 upon the start of the engine 12. The engine-start reaction torque Trfst causes feeling of deceleration of the vehicle 10 due to inertia during the start of the engine 12, namely, drop of the drive torque Tr. Therefore, in the execution of the engine-start control operation, the engine-start control portion 92d outputs the electric-motor control command signal Sm for causing the electric motor MG to output a required starting torque Tst that is the motor torque Tm required for cancelling the engine-start reaction torque Trfst so as to suppress the drop of the drive torque Tr, which could be caused by the engine-start reaction torque Trfst. That is, the torque required to start the engine 12 is the K0 clutch torque Tk0 required to crank the engine 12, and corresponds to the required starting torque Tst that is transmitted to the engine 12 from the electric motor MG through the connecting/disconnecting clutch K0. The torque required to start the engine 12 is a cranking torque whose magnitude is predetermined based on, for example, specifications of the engine 12. Thus, when it is determined that the start of the engine 12 is required or requested, the engine-start control portion 92d starts the engine 12 by causing the electric motor MG to output the required starting torque Ts required to start the engine 12 while controlling the connecting/disconnecting clutch K0 so as to cause the connecting/disconnecting clutch K0 to be engaged.

The shift control portion 94 determines whether a shifting action is to be executed in the automatic transmission 22, by using, for example, a shifting map that represents a predetermined relationship, and outputs the AT hydraulic control command signal Sat, as needed, which is supplied to the hydraulic control unit 56, for executing the shifting action in the automatic transmission 22. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 22. In the shifting map, one of the two variables may be the AT output rotational speed No in place of the vehicle running speed V, and the other of the two variables may be any one of the requested drive power Frdem, accelerator opening degree θacc and throttle opening degree θth in place of the requested drive torque Trdem.

The lockup-clutch control portion 96 controls the operation state of the lockup clutch LU. For example, the lockup-clutch control portion 96 determines in which one of the fully engaged state, slipped state and fully released state the lockup clutch LU is to be placed, by using a lockup region diagram that represents a predetermined relationship, and outputs the LU hydraulic control command signal Slu that is supplied to the hydraulic control unit 56, for causing the lockup-clutch control portion 96 to be placed in the determined one of the fully engaged state, slipped state and fully released state. In the lockup region diagram, the predetermined relationship is represented by a lockup OFF region, a slipped region and a lockup ON region in two-dimensional coordinates in which, for example, the vehicle running speed V and the accelerator opening degree θacc as two variables are taken along respective two axes, wherein the lockup OFF region, slipped region and lockup ON region are used for the determination as to which one of the fully engaged state, slipped state and fully released state the lockup clutch LU is to be placed in. In the lockup region diagram, one of the two variables may be, for example, the AT output rotational speed No in place of the vehicle running speed V, and the other of the two variables may be any one of the requested drive torque Trdem, requested drive power Frdem and throttle opening degree θth in place of the accelerator opening degree θacc.

In a case in which the engine-start control operation is to be executed by the engine-start control portion 92d when the lockup clutch LU is in the fully engaged state, the lockup-clutch control portion 96 outputs the LU hydraulic control command signal Slu that is supplied to the hydraulic control unit 56, for causing the lockup clutch LU to be slipped such that the slip amount Nslp of the lockup clutch LU becomes substantially equal to an engine-start-case target slip amount Nslptgtst in the execution of the engine-start control operation. The engine-start-case target slip amount Nslptgtst is a predetermined value for suppressing an engine start shock, for example. Further, in a case in which the engine-start control operation is to be executed by the engine-start control portion 92d when the lockup clutch LU is in the slipped state with the slip amount Nslp being smaller than the engine-start-case target slip amount Nslptgtst, the lockup-clutch control portion 96 outputs the LU hydraulic control command signal Slu that is supplied to the hydraulic control unit 56, for causing the lockup clutch LU to be slipped such that the slip amount Nslp of the lockup clutch LU becomes substantially equal to the engine-start-case target slip amount Nslptgtst in the execution of the engine-start control operation.

When the engine-start control operation is to be executed during the EV running, the electric motor MG is caused to output the required starting torque Tst in addition to the motor torque Tm for the EV running, i.e., the motor torque Tm serving as the drive torque Tr. To this end, during the EV running, the required starting torque Tst needs to be available or assured in preparation for the engine-start control operation. Therefore, when the engine-start control operation is to be executed, the determination as to whether the requested drive torque Trdem can be covered by only the output of the electric motor MG or not, is made by comparing the requested drive torque Trdem with a torque value obtained by subtracting the required starting torque Tst from an outputtable maximum torque of the electric motor MG The outputtable maximum torque of the electric motor MG is an outputtable maximum value of the motor torque Tm which is dependent on the maximum dischargeable amount Wout of the battery 54. In the following description, the outputtable maximum torque of the electric motor MG will be referred to as "outputtable maximum motor-torque Tmmax".

By the way, the outputtable maximum motor-torque Tmmax is dependent on the motor rotational speed Nm, so that there is a case in which the outputtable maximum motor-torque Tmmax is reduced with increase of the motor rotational speed Nm in process of execution of the engine-start control operation. Therefore, even when the engine-start control operation is initiated with the above-described required starting torque Tst being assured for cancelling the engine-start reaction torque Trfst, if the outputtable maximum motor-torque Tmmax is reduced in process of execution of the engine-start control operation, there is a possibility that the required starting torque Tst could not be assured whereby drivability of the vehicle 10 could be reduced. Such a phenomenon appears remarkably, for example, during running of the vehicle 10 with the torque converter 20 being placed in the torque converter state in which the motor rotational speed Nm is largely fluctuated.

For suppressing the reduction of the drivability upon the start of the engine 12, the electronic control apparatus 90 is configured, during the EV running, to determine whether the start of the engine 12 is requested or not, depending on a predicted value of the outputtable maximum motor-torque Tmmax, which is related to a predicted value of the motor rotational speed Nm, wherein the predicted value of the motor rotational speed Nm is calculated by anticipating possible change of the motor rotational speed Nm which could be caused from a current point of time. The predicted value of the motor rotational speed Nm, which is calculated by anticipating the possible change of the motor rotational speed Nm that could be caused from the current point of time, is a possible future value of the motor rotational speed Nm which could be higher than a value of the motor rotational speed Nm at the current point of time, and will be referred to as "predicted motor rotational speed Nmf" in the following description of the present embodiment. The predicted value of the outputtable maximum motor-torque Tmmax, which is related to the predicted motor rotational speed Nmf, is a possible future value of the outputtable maximum motor-torque Tmmax, and will be referred to as "predicted outputtable maximum motor-torque Tmmaxf" in the following description of the present embodiment.

Figure 2:
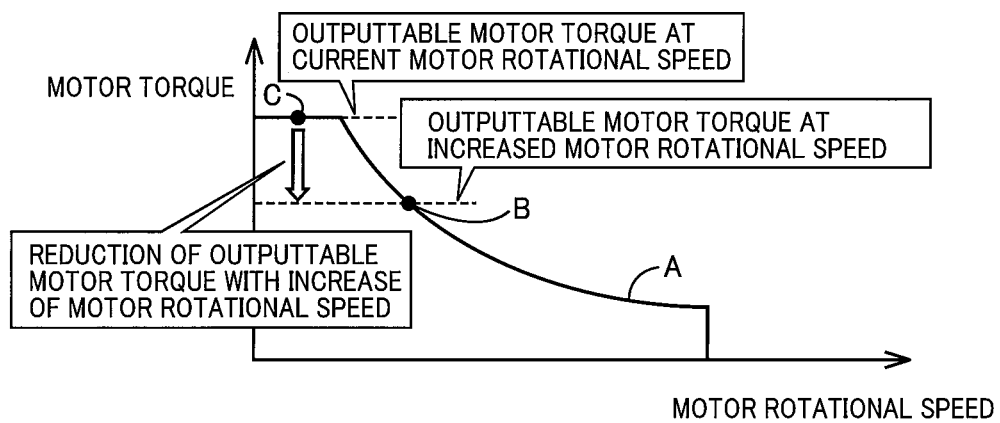
FIG. 2 is a view showing, by way of example, a predicted outputtable maximum motor-torque during running of the vehicle in a torque converter state.

FIG. 2 is a view showing, by way of example, the predicted outputtable maximum motor-torque Tmmaxf during running of the vehicle 10 in a case in which the torque converter 20 is placed in the torque converter state. In FIG. 2, solid line A represents an outputtable maximum motor power Pmmax that is an outputtable maximum value of a motor power Pm, which is dependent on the maximum dischargeable amount Wout of the battery 54. It is determined that the start of the engine 12 is requested when the driver's requested torque Trdemd is increased with increase of the accelerator opening degree θacc during the EV running in the torque converter state of the torque converter 20. When the motor torque Tm is increased with the increase of the driver's requested torque Trdemd, the input torque inputted to the torque converter 20 is increased. In this instance, the motor rotational speed Nm is increased with delay relative to the increase of the input torque inputted to the torque converter 20, wherein the delay is due to fluid characteristics of the torque converter 20. Therefore, even if the increase of the motor toque Tm is limited from a point of time at which it is determined that the start of the engine 12 is requested, there is a possibility that the motor rotational speed Nm could be increased during the process of the engine-start control operation. In the present embodiment, the predicted motor rotational speed Nmf, which is the possible future value of the motor rotational speed Nm that is higher than the current value of the motor rotational speed Nm at the current point of time, is obtained, and the predicted outputtable maximum motor-torque Tmmaxf (see point B in FIG. 2) at the predicted motor rotational speed Nmf is obtained based on the outputtable maximum motor power Pmmax and the predicted motor rotational speed Nmf. The predicted outputtable maximum motor-torque Tmmaxf is made lower than the outputtable maximum motor-torque Tmmax (see point C in FIG. 2) in the current value of the motor rotational speed Nm, due to the increase of the motor rotational speed Nm.

Figure 3:
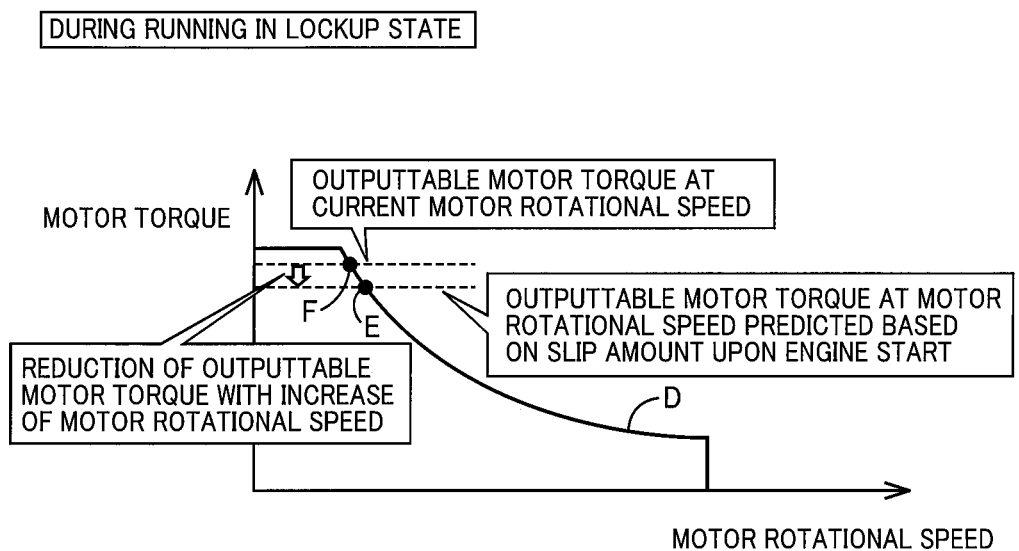
FIG. 3 is a view showing, by way of example, the predicted outputtable maximum motor-torque during running of the vehicle in a lockup state.

FIG. 3 is a view showing, by way of example, the predicted outputtable maximum motor-torque Tmmaxf during running of the vehicle 10 in a case in which the torque converter 20 is placed in the lockup state. In FIG. 3, solid line D represents a characteristic of the outputtable maximum motor power Pmmax. It is determined that the start of the engine 12 is requested when the driver's requested torque Trdemd is increased during the EV running in the lockup state. During the EV running in the lockup state of the torque converter 20, even when the motor torque Tm is increased with increase of the driver's requested torque Trdemd, the motor rotational speed Nm is a value equal to the turbine rotational speed Nt that is constrained by the vehicle running speed V. However, during the EV running in the lockup state of the torque converter 20, when the engine-start control operation is executed, the lockup clutch LU is slipped during execution of the engine-start control operation so that the motor rotational speed Nm is made higher than the turbine rotational speed Nt by the engine-start-case target slip amount Nslptgtst in process of the execution of the engine-start control operation. In the present embodiment, the predicted motor rotational speed Nmf, which is the possible future value of the motor rotational speed Nm that is higher than the current value of the motor rotational speed Nm by the engine-start-case target slip amount Nslptgtst, is obtained, and the predicted outputtable maximum motor-torque Tmmaxf (see point E in FIG. 3) at the predicted motor rotational speed Nmf is obtained based on the outputtable maximum motor power Pmmax and the predicted motor rotational speed Nmf. The predicted outputtable maximum motor-torque Tmmaxf is made lower than the outputtable maximum motor-torque Tmmax (see point F in FIG. 3) at the current value of the motor rotational speed Nm, due to the increase of the motor rotational speed Nm.

For achieving function of suppressing reduction of the drivability of the vehicle 10 by making it easy to assure the required starting torque Tst that is the motor torque Tm required to start the engine 12 upon the start of the engine 12, i.e., in the process of the start of the engine 12, the electronic control apparatus 90 further includes a state determination means in the form of a state determination portion 98. Further, for achieving the above-described function, the hybrid control portion 92 includes function of an electric-motor rotational-speed prediction means in the form of an electric-motor rotational-speed prediction portion 92e, and function of an electric-motor torque prediction means in the form of an electric-motor torque prediction portion 92f.

The state determination portion 98 is configured to determine whether the vehicle 10 is in the EV running or not, and is configured, when determining that the vehicle 10 is in the EV running, to determine whether the lockup clutch LU is in an engaged state or not. The engaged state includes not only a fully engaged state but also a slipped state in which the lockup clutch LU is engaged but slipped to a certain extent. That is, the state determination portion 98 makes the determination as to whether the lockup clutch LU is in the engaged state or not, depending on whether the operation state of the lockup clutch LU is one of the slipped state and the fully engaged state or not.

When it is determined by the state determination portion 98 that the vehicle 10 is in the EV running, the electric-motor rotational-speed prediction portion 92e is configured to calculate the predicted motor rotational speed Nmf, by anticipating possible change of the motor rotational speed Nm, depending on the operation state of the lockup clutch LU.

Figure 4:
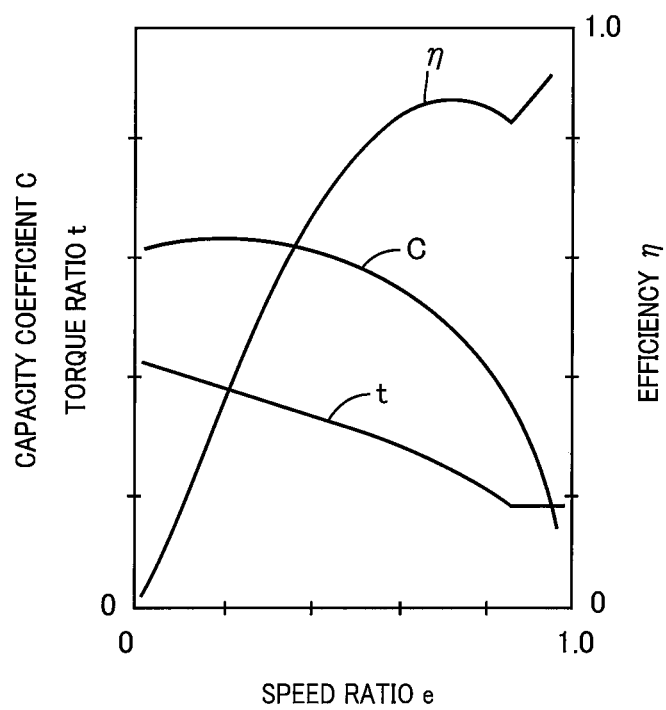
FIG. 4 is a view, by way of examples, characteristic curves of a torque converter, which represent a relationship between a speed ratio and a torque ratio, a relationship between the speed ratio and an efficiency and a relationship between the speed ratio and a capacity coefficient.

When it is determined by the state determination portion 98 that the vehicle 10 is in the EV running and that the operation state of the lockup clutch LU is a fully released state, the electric-motor rotational-speed prediction portion 92e calculates the predicted motor rotational speed Nmf, based on the turbine rotational speed Nt, the driver's requested torque Trdemd and a predetermined operation characteristic of the torque converter 20. Specifically described, the electric-motor rotational-speed prediction portion 92e sets a tentative pump rotational speed Npt (that is a tentative value of the pump rotational speed Np) to, for example, a value that is higher than the turbine rotational speed Nt by a predetermined amount. Then, the electric-motor rotational-speed prediction portion 92e calculates a tentative speed ratio et (=Nt/Npt) (that is a tentative value of the speed ratio e (=Nt/Np) of the torque converter 20), based on the tentative pump rotational speed Npt and the turbine rotational speed Nt. Further, the electric-motor rotational-speed prediction portion 92e calculates a tentative capacity coefficient Ct (that is a tentative value of a capacity coefficient C of the torque converter 20), by applying the tentative speed ratio et to the predetermined operation characteristic of the torque converter 20 which is represented by the relationship between the speed ratio e and the capacity coefficient C of the torque converter 20, as shown in FIG. 4. FIG. 4 is a view, by way of examples, characteristic curves in the torque converter 20, which represent a relationship between the speed ratio e and a torque ratio t, a relationship between the speed ratio e and an efficiency η and a relationship between the speed ratio t and the capacity coefficient C. The electric-motor rotational-speed prediction portion 92e calculates a tentative pump torque Tpt that is a tentative value of a pump torque Tp, i.e., the input torque inputted to the torque converter 20, by applying the tentative capacity coefficient Ct and the tentative pump rotational speed Npt to equation (1) given below. The input torque of the torque converter 20 during the EV running corresponds to the motor torque Tm for the EV running. The motor torque Tm for the EV running is the motor torque Tm for providing the driver's requested torque Trdemd, and corresponds to a converted value of the driver's requested torque Trdemd which is converted on the electric-motor connection shaft 34 that is an output shaft of the electric motor MG Further, the pump rotational speed Np is a value equal to the motor rotational speed Nm. The electric-motor rotational-speed prediction portion 92e calculates, as the predicted motor rotational speed Nmf, the motor rotational speed Nm that causes the tentative pump torque Tpt equal to the converted value of the driver's requested torque Trdemd which is converted on the electric-motor connection shaft 34.

$$Tp = C \times Np^2 \quad (1)$$

When it is determined by the state determination portion 98 that the vehicle 10 is in the EV running and that the operation state of the lockup clutch LU is the slipped state or fully engaged state, the electric-motor rotational-speed prediction portion 92e calculates, as the predicted motor rotational speed Nmf, a sum (=Nt+Nslptgtst) of the turbine rotational speed Nt and the engine-start-case target slip amount Nslptgtst. The engine-start-case target slip amount Nslptgtst corresponds to the slip amount Nslp of the lockup clutch LU in the process of execution of the engine-start control operation.

The electric-motor torque prediction portion 92f calculates the predicted outputtable maximum motor-torque Tmmaxf, by using the predicted motor rotational speed Nmf. Specifically, the electric-motor torque prediction portion 92f calculates the predicted outputtable maximum motor-torque Tmmaxf, based on the outputtable maximum motor power Pmmax and the predicted motor rotational speed Nmf (see FIGS. 2 and 3). The outputtable maximum motor power Pmmax corresponds to the maximum dischargeable amount Wout of the battery 54.

The engine-start-request determination portion 92c determines whether the start of the engine 12 is requested or not, by using the predicted outputtable maximum motor-torque Tmmaxf. Specifically described, the engine-start-request determination portion 92c determines whether the start of the engine 12 is requested or not, based on the predicted outputtable maximum motor-torque Tmmaxf and the driver's requested torque Trdemd. The engine-start-request determination portion 92c determines whether the start of the engine 12 is requested or not, depending on whether the driver's requested torque Trdemd has exceeded an engine-start determination value VLjs (=Tmmaxf−Tst) or not, wherein the engine-start determination value VLjs is obtained by subtracting the required starting torque Tst from the predicted outputtable maximum motor-torque Tmmaxf. It is noted that, in the determination as to whether the start of the engine 12 is requested or not, the converted value of the driver's requested torque Trdemd, which is converted on the electric-motor connection shaft 34, is used.

When it is determined by the state determination portion 98 that the vehicle 10 is in the EV running and also it is determined by the engine-start-request determination portion 92c that the driver's requested torque Trdemd exceeds the engine-start determination value VLjs, namely, that the start of the engine 12 is requested, the engine-start control portion 92d initiates execution of the engine-start control operation.

Owing to the above-described control, the engine-start control operation is executed in a state in which the required starting torque Tst is easily assured even when the motor rotational speed Nm is increased to the predicted motor rotational speed Nmf in the process of execution of the engine-start control operation. However, if the driver's requested torque Trdemd is further increased after the point of time at which it is determined that the start of the engine 12 is requested, there is a risk that a part of the required starting torque Tst could be used for driving the vehicle 10 that is in the EV running. For avoiding such a risk, when it is determined by the engine-start-request determination portion 92c that the start of the engine 12 is requested, the engine-start control portion 92d sets an upper limit of the driver's requested torque Trdemd used for driving the vehicle 10 in the EV running, to the driver's requested torque Trdemd at the point of time at which it is determined that the start of the engine 12 is requested, namely, to the engine-start determination value VLjs at the point of time at which it is determined that the start of the engine 12 is requested. The engine-start control portion 92d keeps the upper limit of the driver's requested torque Trdemd until the execution of the engine-start control operation is completed. The driver's requested torque Trdemd used for driving the vehicle 10 in the EV running means the driver's requested torque Trdemd based on which the motor torque Tm for the EV running is to be calculated.

Figure 5:
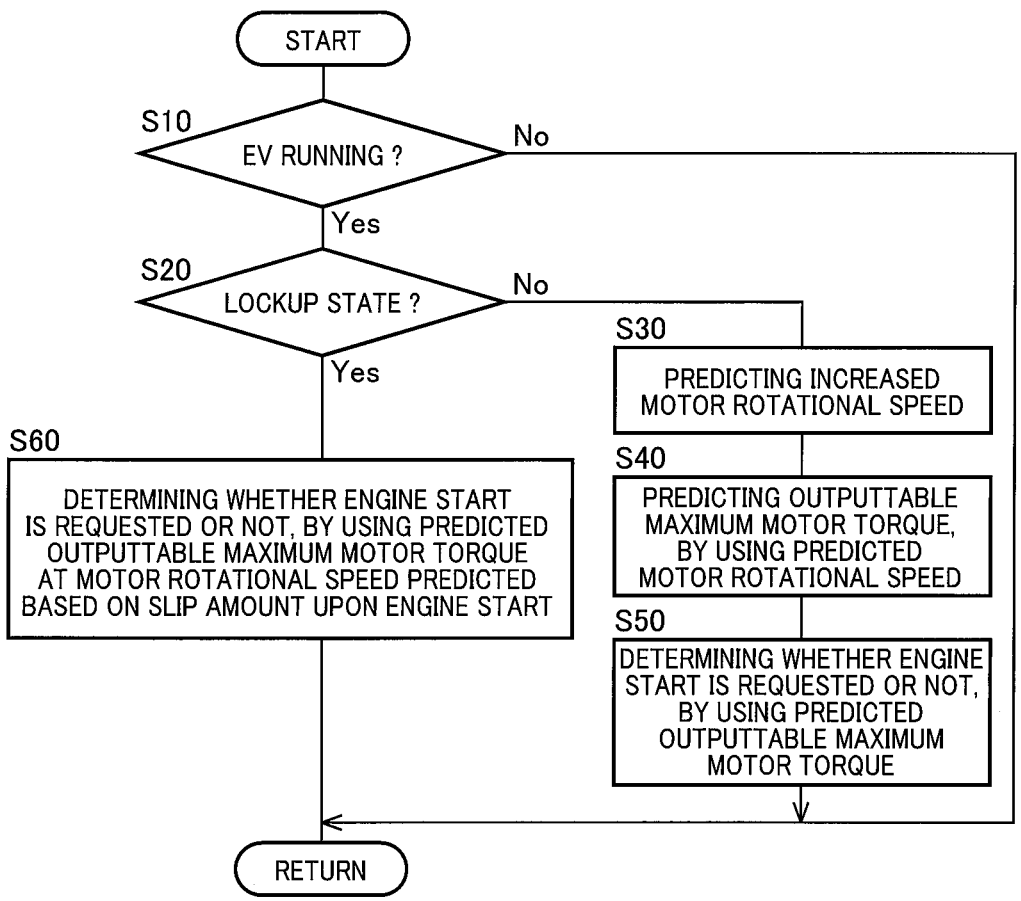
FIG. 5 is a flow chart showing a main part of a control routine executed by the electronic control apparatus, namely, a control routine that is executed for suppressing reduction of drivability of the vehicle by making it easy to assure an electric motor torque required to start the engine upon start of the engine, i.e., during process of the start of the engine.

FIG. 5 is a flow chart showing a main part of a control routine executed by the electronic control apparatus 90, namely, a control routine that is executed for suppressing reduction of the drivability of the vehicle 10 by making it easy to assure the required starting torque Tst upon the start of the engine 12, i.e., during process of the start of the engine 12. This control routine is executed, for example, in a repeated manner.

As shown in FIG. 5, this control routine is initiated with step S10 corresponding to function of the state determination portion 98, which is implemented to determine whether the vehicle 10 is in the EV running or not. When a negative determination is made at step S10, one cycle of execution of the control routine is terminated. When an affirmative determination is made at step S10, step S20 corresponding to function of the state determination portion 98 is implemented to determine whether the operation state of the lockup clutch LU is the slipped state or the fully engaged state, namely, whether the lockup clutch LU is in the engaged state or not. When a negative determination is made at step S20, namely, when the operation state of the lockup clutch LU is neither the slipped state nor the fully engaged state, the control flow goes to step S30 corresponding to function of the electric-motor rotational-speed prediction portion 92e, which is implemented to calculate the predicted motor rotational speed Nmf, based on the turbine rotational speed Nt, the driver's requested torque Trdemd and the predetermined operation characteristic of the torque converter 20. Step S30 is followed by step S40 corresponding to function of the electric-motor torque prediction portion 92f, which is implemented to calculate the predicted outputtable maximum motor-torque Tmmaxf, based on the outputtable maximum motor power Pmmax and the predicted motor rotational speed Nmf. Then, step S50 corresponding to function of the engine-start-request determination portion 92c is implemented to determine whether the start of the engine 12 is requested or not, depending on whether the driver's requested torque Trdemd has exceeded the engine-start determination value VLjs that is obtained by subtracting the required starting torque Tst from the predicted outputtable maximum motor-torque Tmmaxf. On the other hand, when an affirmative determination is made at step S20, step S60 corresponding to functions of the electric-motor rotational-speed prediction portion 92e, electric-motor torque prediction portion 92f and engine-start-request determination portion 92c is implemented to determine whether the start of the engine 12 is requested or not, by using the predicted outputtable maximum motor-torque Tmmaxf that is dependent on the predicted motor rotational speed Nmf corresponding to a sum of the turbine rotational speed Nt and the engine-start-case target slip amount Nslptgtst.

As described above, in the present embodiment, during the EV running, the predicted motor rotational speed Nmf is calculated depending on the operation state of the lockup clutch LU, and the predicted outputtable maximum motor-torque Tmmaxf, by using the predicted motor rotational speed Nmf. Then, it is determined whether the start of the engine 12 is requested or not, by using the predicted outputtable maximum motor-torque Tmmaxf. Owing to this control arrangement, even if the outputtable maximum motor-torque Tmmax is made lower in future than the outputtable maximum motor-torque Tmmax at the point of time at which the start of the engine 12 is initiated, it is possible to initiate the start of the engine 12 in a state facilitating assurance of the required starting torque Tst in the process of the start of the engine 12. Thus, the required starting torque Tst is easily assured upon the start of the engine 12, namely, in the process of the start of the engine 12, thereby making it possible to suppress reduction of the drivability.

In the above-described embodiment, in the case in which the lockup clutch LU is in the released state, the predicted motor rotational speed Nmf is calculated, based on the turbine rotational speed Nt, the driver's requested torque Trdemd and the operation characteristic of the torque converter 20, so that the predicted motor rotational speed Nmf is appropriately calculated, by using the predicted motor rotational speed Nmf in the released state of the lockup clutch LU. Owing to this control arrangement, it is possible to initiate the start of the engine 12 in the state facilitating assurance of the required starting torque Tst in the process of the start of the engine 12, even in the released state of the lockup clutch LU in which the outputtable maximum motor-torque Tmmax is likely to be reduced by increase of the motor rotational speed Nm in the process of the start of the engine 12.

In the above-described embodiment, in the case in which the lockup clutch LU is in the engaged state, the sum of the turbine rotational speed Nt and the engine-start-case target slip amount Nslptgtst of the lockup clutch LU is calculated as the predicted motor rotational speed Nmf, so that the predicted motor rotational speed Nmf is appropriately calculated, by using the predicted motor rotational speed Nmf in the engaged state of the lockup clutch LU. Owing to this control arrangement, it is possible to initiate the start of the engine 12 in the state facilitating assurance of the required starting torque Tst in the process of the start of the engine 12, even in the engaged state of the lockup clutch LU in which the lockup clutch LU is slipped in the process of the start of the engine 12.

In the above-described embodiment, the predicted outputtable maximum motor-torque Tmmaxf is calculated based on the predicted motor rotational speed Nmf and the maximum dischargeable amount Wout, so that the predicted outputtable maximum motor-torque Tmmaxf can be appropriately calculated.

In the above-described embodiment, it is determined whether the start of the engine 12 is requested or not, depending on whether the driver's requested torque Trdemd has exceeded the engine-start determination value VLjs that is obtained by subtracting the required starting torque Tst from the predicted outputtable maximum motor-torque Tmmaxf. Owing to this control arrangement, it is possible to appropriately initiate the start of the engine 12 in the state facilitating assurance of the required starting torque Tst in the process of the start of the engine 12.

In the above-described embodiment, when it is determined that the start of the engine 12 is requested, the upper limit of the driver's requested torque Trdemd used for the EV running is set to the engine-start determination value VLjs at the point of time at which it is determined that the start of the engine 12 is requested, and the upper limit of the driver's requested torque Trdemd is kept in the period until the start of the engine 12 is completed. Owing to this control arrangement, it is possible to execute the start of the engine 12 in the state facilitating assurance of the required starting torque Tst in the process of the start of the engine 12, even if the actual driver's requested torque Trdemd is made larger than at the point of time at which it is determined that the start of the engine 12 is requested.

There will be described another embodiment of this invention. The same reference signs as used in the above-described first embodiment will be used in the following embodiment, to identify the functionally corresponding elements, and descriptions thereof are not provided.

Second Embodiment

In the above-described first embodiment, the engine-start determination value VLjs is a value obtained by subtracting the required starting torque Tst from the predicted outputtable maximum motor-torque Tmmaxf. The predicted outputtable maximum motor-torque Tmmaxf is influenced by accuracy of the calculation of the predicted motor rotational speed Nmf, which is calculated by anticipating change of the motor rotational speed Nm. Therefore, it is possible to estimate the predicted motor rotational speed Nmf on a safety side, namely, on a higher side, so that the outputtable maximum motor-torque Tmmax is reduced, and the reduction of the outputtable maximum motor-torque Tmmax may be reflected on the engine-start determination value VLjs. In this case, an amount of the reduction of the outputtable maximum motor-torque Tmmax corresponds to a predetermined prediction variation margin Tfmgn as a margin amount (safety amount) of the outputtable maximum motor-torque Tmmax that is determined in view of a variation caused in the anticipation of change of the motor rotational speed Nm. The margin amount of the outputtable maximum motor-torque Tmmax, which is determined in view of the variation possibly caused in the anticipation of change of the motor rotational speed Nm, corresponds to a margin amount that is determined in view of the accuracy of the calculation of the predicted motor rotational speed Nmf.

Therefore, in this second embodiment of the present invention, the engine-start-request determination portion 92c determines whether the start of the engine 12 is requested (required) or not, depending on whether the driver's requested torque Trdemd has exceeded the engine-start determination value VLjs (=Tmmaxf−(Tst+Tfmgn)) or not, wherein the engine-start determination value VLjs (=Tmmaxf (Tst+Tfmgn)) is obtained by subtracting a sum of the required starting torque Tst and the prediction variation margin Tfmgn, from the predicted outputtable maximum motor-torque Tmmaxf.

The prediction variation margin Tfmgn is provided for suppressing influence of the accuracy of calculation of the predicted motor rotational speed Nmf, and is not needed to assure the required starting torque Tst in the outputtable maximum motor-torque Tmmax. During the EV running, the driver's requested torque Trdemd could be difficult to be satisfied due to the prediction variation margin Tfmgn, namely, the driver's requested torque Trdemd could be limited further due to the prediction variation margin Tfmgn. Therefore, in this second embodiment, when it is determined by the engine-start-request determination portion 92c that the start of the engine 12 is requested, the engine-start control portion 92d sets an upper limit of the driver's requested torque Trdemd used for driving the vehicle 10 in the EV running, to a sum of the prediction variation margin Tfmgn and the driver's requested torque Trdemd at the point of time at which it is determined that the start of the engine 12 is requested, namely, to a sum of the prediction variation margin Tfmgn and the engine-start determination value VLjs at the point of time at which it is determined that the start of the engine 12 is requested. The engine-start control portion 92d keeps the upper limit of the driver's requested torque Trdemd until the execution of the engine-start control operation is completed.

Figure 6:
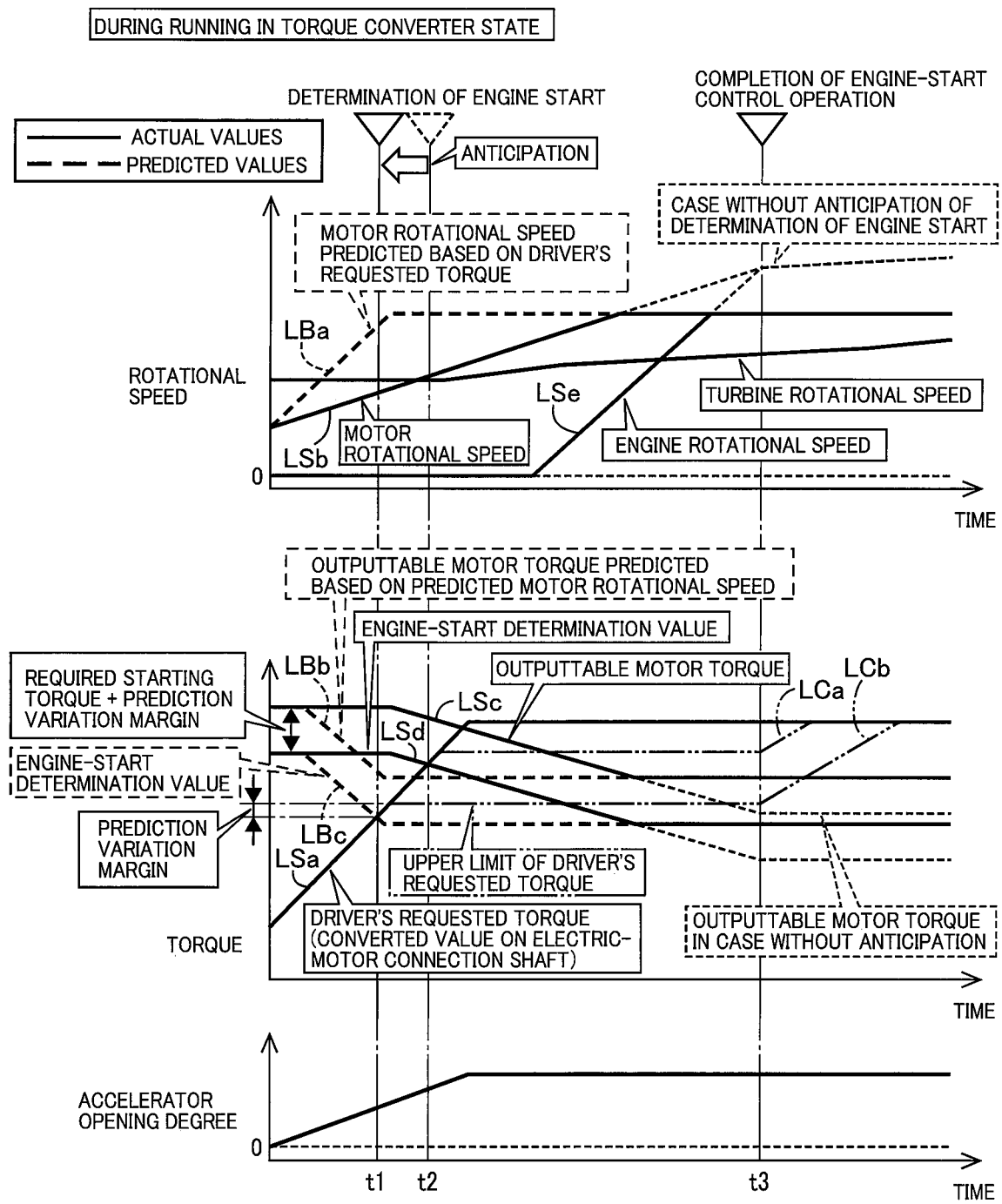
FIG. 6 is a time chart showing, by way of example, a case in which the control routine shown in the flow chart of FIG. 5 is executed with a prediction variation margin being additionally taken into consideration, during running of the vehicle in a torque converter state.
Figure 7:
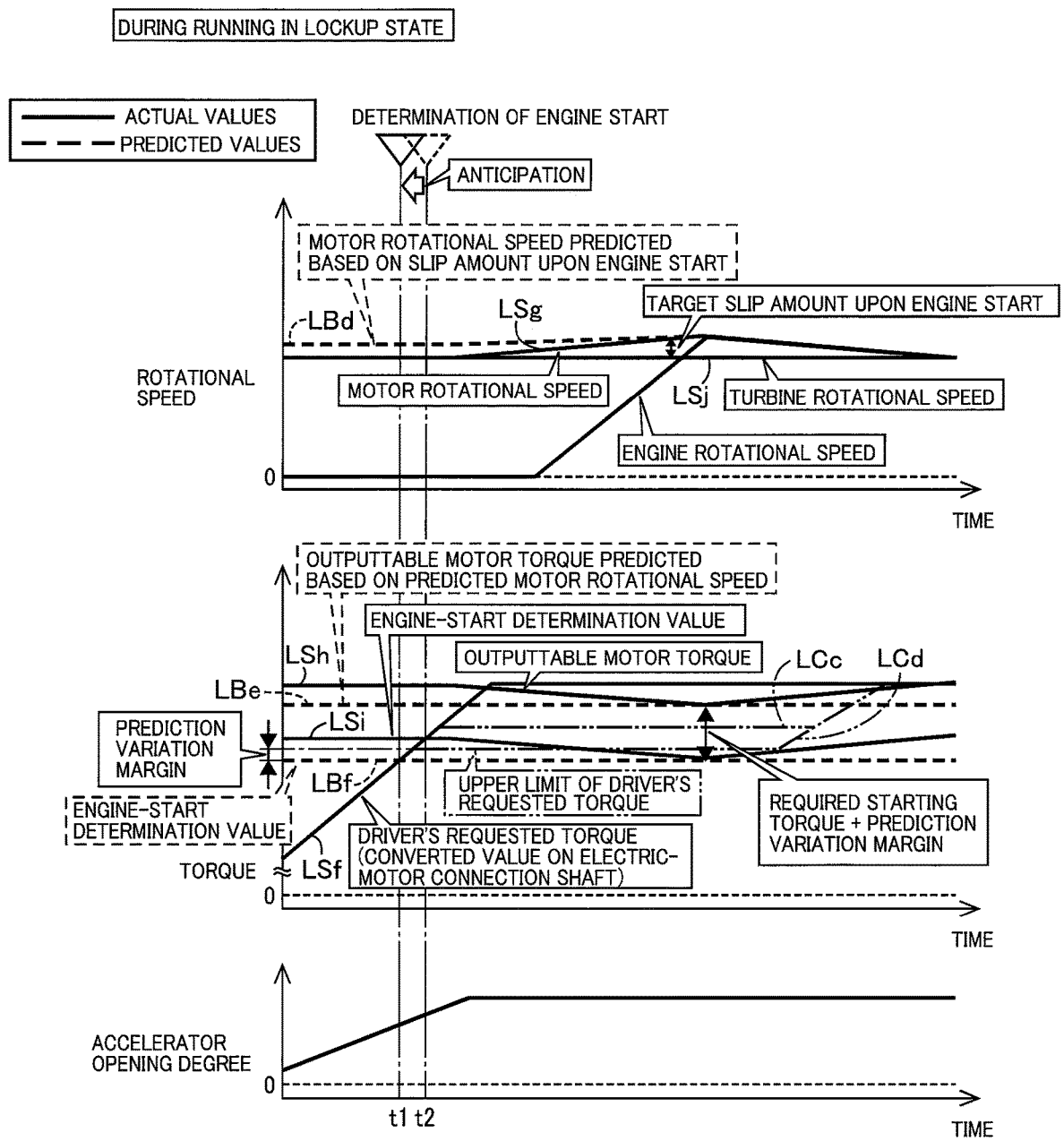
FIG. 7 is a time chart showing, by way of example, a case in which the control routine shown in the flow chart of FIG. 5 is executed with the prediction variation margin being additionally taken into consideration, during running of the vehicle in a lockup state.

Each of FIGS. 6 and 7 is a time chart showing, by way of example, a case in which the control routine shown in the flow chart of FIG. 5 is executed with the prediction variation margin Tfmgn being additionally taken into consideration.

FIG. 6 shows, by way of example, a case in which the vehicle 10 runs in the torque converter state of the torque converter 20. In FIG. 6, solid lines LS represent actual values while broken lines LB represent predicted values. During the EV running with acceleration OFF, the driver's requested torque Trdemd is increased (see solid line LSa) in response to acceleration ON. In a comparative example without use of the predicted values, it is determined that the start of the engine 12 is requested (see time point t2) when the driver's requested torque Trdemd has exceeded the engine-start determination value VLjs (see solid line LSd) that is obtained by subtracting a sum of the required starting torque Tst and the prediction variation margin Tfmgn, from the outputtable maximum motor-torque Tmmax (see solid line LSc) that is calculated by using the motor rotational speed Nm (see solid line LSb). Even if an increase of the driver's requested torque Trdemd is limited to a sum (see two-dot chain line LCa) of the prediction variation margin Tfmgn and the engine-start determination value VLjs (see solid line LSd) at the time point t2, throughout a period from the time point t2 to a time point t3 at which execution of the engine-start control operation is completed, the motor rotational speed Nm is increased due to the fluid characteristics of the torque converter 20 in process of the execution of the engine-start control operation in which the engine rotational speed Ne (see solid line LSe) is increased to be equal to the motor rotational speed Nm. Therefore, in the comparative example without use of the predicted values, the required starting torque Tst could not be assured in the process of the execution of the engine-start control operation, thereby causing a risk of reduction of the drivability. On the other hand, in the present second embodiment using the predicted values, the predicted motor rotational speed Nmf (see broken line LBa) is calculated based on the driver's requested torque Trdemd, and the predicted outputtable maximum motor-torque Tmmaxf (see broken line LBb) is calculated by using the predicted motor rotational speed Nmf. It is determined that the start of the engine 12 is requested (see time point t1) when the driver's requested torque Trdemd has exceeded the engine-start determination value VLjs (see broke line LBc) that is obtained by subtracting the sum of the required starting torque Tst and the prediction variation margin Tfmgn, from the predicted outputtable maximum motor-torque Tmmaxf. That is, in the present second embodiment using the predicted values, as compared with in the comparative example without use of the predicted values, the determination of the request for the start of the engine 12 is made at an earlier stage, owing to anticipation of the reduction of the outputtable maximum motor-torque Tmmax. It is noted that, in a control arrangement (as in the above-described first embodiment) in which the prediction variation margin Tfmgn is not additionally taken into account, the engine-start determination value VLjs is a value obtained by subtracting the required starting torque Tst from the predicted outputtable maximum motor-torque Tmmaxf. Thus, in the present second embodiment, the determination of presence or absence of the request for the start of the engine 12 is made based on the predicted motor rotational speed Nmf that is calculated by anticipating increase of the actual motor rotational speed Nm in the process of the execution of the engine-start control operation, the engine-start control operation can be executed with the required starting torque Tst being easily and reliably assured. Further, with the prediction variation margin Tfmgn being additionally taken into consideration, the engine-start control operation can be executed with the required starting torque Tst being more appropriately assured. Further, in the present second embodiment, when it is determined that the start of the engine 12 is requested at the time point t1, an upper limit of the driver's requested torque Trdemd used for the EV running is set to a value (see two-dot chain line LCb) that is obtained by adding the prediction variation margin Tfmgn to the engine-start determination value VLjs (see broken like LBc) at the time point t1, and the driver's requested torque Trdemd is kept limited to the upper limit until the execution of the engine-start control operation is completed. It is noted that, in the control arrangement (as in the above-described first embodiment) in which the prediction variation margin Tfmgn is not additionally taken into account, the upper limit of the driver's requested torque Trdemd is set to the engine-start determination value VLjs (see broken like LBc) at the time point t1. Owing to the limitation of increase of the driver's requested torque Trdemd, it is possible to avoid the required starting torque Tst from being used as the motor torque Tm for the EV running in the process of the execution of the engine-start control operation. Further, since the upper limit of the driver's requested torque Trdemd is set to the value corresponding the sum of the prediction variation margin Tfmgn and the engine-start determination value VLjs, rather than to the engine-start determination value VLjs, the upper limit of the driver's requested torque Trdemd can be made larger by an amount corresponding to the prediction variation margin Tfmgn.

FIG. 7 shows, by way of example, a case in which the vehicle 10 runs in the lockup state of the torque converter 20. In FIG. 7, solid lines LS represent actual values while broken lines LB represent predicted values. During the EV running, the driver's requested torque Trdemd is increased (see solid line LSf) with increase of the accelerator opening degree θacc. In a comparative example without use of the predicted values, it is determined that the start of the engine 12 is requested (see time point t2) when the driver's requested torque Trdemd has exceeded the engine-start determination value VLjs (see solid line LSi) that is obtained by subtracting a sum of the required starting torque Tst and the prediction variation margin Tfmgn, from the outputtable maximum motor-torque Tmmax (see solid line LSh) that is calculated by using the motor rotational speed Nm (see solid line LSg). Even if an increase of the driver's requested torque Trdemd is limited to a sum (see two-dot chain line LCc) of the prediction variation margin Tfmgn and the engine-start determination value VLjs (see solid line LSi) at the time point t2, throughout a period from the time point t2, the lockup clutch LU is slipped in process of the execution of the engine-start control operation, so that the motor rotational speed Nm is increased to be larger than the turbine rotational speed Nt by an amount corresponding to the engine-start-case target slip amount Nslptgtst in the process of the execution of the engine-start control operation. Therefore, in the comparative example without use of the predicted values, the required starting torque Tst could not be assured in the process of the execution of the engine-start control operation, thereby causing a risk of reduction of the drivability. On the other hand, in the present second embodiment using the predicted values, the predicted motor rotational speed Nmf (see broken line LBd) is calculated by adding the engine-start-case target slip amount Nslptgtst to the turbine rotational speed Nt (see solid line LSj), and the predicted outputtable maximum motor-torque Tmmaxf (see broken line LBe) is calculated by using the predicted motor rotational speed Nmf. It is determined that the start of the engine 12 is requested (see time point t1) when the driver's requested torque Trdemd has exceeded the engine-start determination value VLjs (see broke line LBf) that is obtained by subtracting the sum of the required starting torque Tst and the prediction variation margin Tfmgn, from the predicted outputtable maximum motor-torque Tmmaxf. Thus, in the present second embodiment, the determination of presence or absence of the request for the start of the engine 12 is made based on the predicted motor rotational speed Nmf that is calculated by anticipating increase of the actual motor rotational speed Nm in the process of the execution of the engine-start control operation, the engine-start control operation can be executed with the required starting torque Tst being easily and reliably assured. Further, with the prediction variation margin Tfmgn being additionally taken into consideration, the engine-start control operation can be executed with the required starting torque Tst being more appropriately assured. Further, in the present second embodiment, when it is determined that the start of the engine 12 is requested at the time point t1, an upper limit of the driver's requested torque Trdemd used for the EV running is set to a value (see two-dot chain line LCd) that is obtained by adding the prediction variation margin Tfmgn to the engine-start determination value VLjs (see broken like LBf) at the time point t1, and the driver's requested torque Trdemd is kept limited to the upper limit until the execution of the engine-start control operation is completed. Owing to the limitation of increase of the driver's requested torque Trdemd, it is possible to avoid the required starting torque Tst from being used as the motor torque Tm for the EV running in the process of the execution of the engine-start control operation. Further, since the upper limit of the driver's requested torque Trdemd is set to the value corresponding the sum of the prediction variation margin Tfmgn and the engine-start determination value VLjs, rather than to the engine-start determination value VLjs, the upper limit of the driver's requested torque Trdemd can be made larger by an amount corresponding to the prediction variation margin Tfmgn.

As described above, in the present second embodiment, as in the above-described first embodiment, the required starting torque Tst is easily assured upon the start of the engine 12, namely, in the process of the start of the engine 12, thereby making it possible to suppress reduction of the drivability.

In the present second embodiment, it is determined whether the start of the engine 12 is requested or not, depending on whether the driver's requested torque Trdemd has exceeded the engine-start determination value VLjs that is obtained by subtracting the sum of the required starting torque Tst and the prediction variation margin Tfmgn from the predicted outputtable maximum motor-torque Tmmaxf, wherein the prediction variation margin Tfmgn is dependent on accuracy of the calculation of the predicted motor rotational speed Nmf. Owing to this control arrangement, it is possible to appropriately initiate the start of the engine 12 in the state facilitating assurance of the required starting torque Tst in the process of the start of the engine 12.

In the present second embodiment, when it is determined that the start of the engine 12 is requested, the upper limit of the driver's requested torque Trdemd used for the EV running is set to the sum of the prediction variation margin Tfmgn and the engine-start determination value VLjs at the point of time at which it is determined that the start of the engine 12 is requested, and the upper limit of the driver's requested torque Trdemd is kept in the period until the start of the engine 12 is completed. Owing to this control arrangement, it is possible to execute the start of the engine 12 in the state facilitating assurance of the required starting torque Tst in the process of the start of the engine 12, and to cause the upper limit of the driver's requested torque Trdemd to be made larger by an amount corresponding to the prediction variation margin Tfmgn.

While the preferred embodiments of this invention have been described in detail by reference to the drawings, it is to be understood that the invention may be otherwise embodied.

For example, in the above-described embodiments, the control routine shown in the flow chart of FIG. 5 may be modified as needed, for example, such that step S60 is implemented to only calculate the predicted motor rotational speed Nmf, and step S40 and step S50 are implemented after implementation of step S60 or step S30.

In the above-described embodiments, the automatic transmission 22, which constitutes a part of the power transmission path between the engine 12 and the drive wheels 14 so as to transmit the drive powers of the drive power sources (engine 12, electric motor MG), is constituted by the automatic transmission of a planetary gear type. However, the automatic transmission 22 may be constituted by any other transmission such as a known belt-type continuously-variable transmission and a known synchronous mesh twin shaft parallel axis-type transmission including DCT (dual clutch transmission).

In the above-described embodiments, the fluid-type transmission device is constituted by the torque converter 20. However, the fluid-type transmission device does not have to be constituted necessarily by the torque converter 20, but may be constituted by another other fluid-type transmission device such as a fluid coupling device without a function of torque boost effect. The present invention is applicable to any vehicle that includes (i) an engine, (ii) drive wheels, (iii) an electric motor provided in a power transmission path between the engine and the drive wheels and connected to the engine and the drive wheels in a power transmittable manner, (iv) a clutch provided in the power transmission path, and configured to separate connection between the engine and the electric motor when the clutch is released, and (v) a fluid-type transmission device including a lockup clutch and constituting a part of the power transmission path so as to transmit a drive power of the engine and/or a drive power of the electric motor to the drive wheels.

It is to be understood that the embodiments described above are given for illustrative purpose only, and that the present invention may be embodied with various modifications and improvements which may occur to those skilled in the art.

NOMENCLATURE OF ELEMENTS

10: vehicle
12: engine
14: drive wheels
20: torque converter (fluid-type transmission device)
54: battery (electrical storage device)
90: electronic control apparatus (control apparatus)
92*c*: engine-start-request determination portion
92*d*: engine-start control portion
92*e*: electric-motor rotational-speed prediction portion
92*f*: electric-motor torque prediction portion
K0: connecting/disconnecting clutch (clutch)
LU: lockup clutch
MG: electric motor

What is claimed is:

1. A control apparatus for a vehicle that includes (i) an engine, (ii) drive wheels, (iii) an electric motor provided in a power transmission path between the engine and the drive wheels and connected to the engine and the drive wheels in a power transmittable manner, (iv) a clutch provided in the power transmission path, and configured to separate connection between the engine and the electric motor when the clutch is released, and (v) a fluid-type transmission device including a lockup clutch and constituting a part of the power transmission path so as to transmit a drive power of the engine and/or a drive power of the electric motor to the drive wheels, the control apparatus comprising:
an electric-motor rotational-speed prediction portion that is configured, during motor running of the vehicle by the drive power of the electric motor with the clutch being released, to calculate a predicted value of a rotational speed of the electric motor, by anticipating change of the rotational speed of the electric motor, depending on an operation state of the lockup clutch;
an electric-motor torque prediction portion that is configured to calculate a predicted value of an outputtable maximum torque of the electric motor, by using the predicted value of the rotational speed of the electric motor;
an engine-start-request determination portion that is configured to determine whether start of the engine is requested or not, by using the predicted value of the outputtable maximum torque of the electric motor; and
an engine-start control portion that is configured, when it is determined that the start of the engine is requested, to start the engine by causing the electric motor to output a required starting torque required to start the engine while causing the clutch to be engaged,
wherein the electric-motor rotational-speed prediction portion is configured, in a case in which the lockup clutch is in a released state, to calculate the predicted value of the rotational speed of the electric motor, based on an output rotational speed of the fluid-type transmission device, a requested drive amount of the vehicle requested by a driver of the vehicle and an operation characteristic of the fluid-type transmission device.

2. The control apparatus according to claim 1,
wherein the electric-motor rotational-speed prediction portion is configured, in a case in which the lockup clutch is in an engaged state, to calculate, as the predicted value of the rotational speed of the electric motor, a sum of an output rotational speed of the fluid-type transmission device and a slip rotational speed of the lockup clutch in process of the start of the engine.

3. The control apparatus according to claim 1,
wherein the vehicle further includes an electrical storage device configured to supply and receive an electric power to and from the electric motor, and wherein the electric-motor torque prediction portion is configured to calculate the predicted value of the outputtable maximum torque of the electric motor, based on a limitation of output from the electrical storage device and the predicted value of the rotational speed of the electric motor.

4. The control apparatus according to claim 1,
wherein the engine-start-request determination portion is configured to determine whether the start of the engine is requested or not, depending on whether a requested drive amount of the vehicle requested by a driver of the vehicle has exceeded an engine-start determination value that is obtained by subtracting the required starting torque from the predicted value of the outputtable maximum torque of the electric motor.

5. The control apparatus according to claim 4,
wherein the engine-start control portion is configured, when it is determined that the start of the engine is requested, to set an upper limit of the requested drive amount, to the engine-start determination value at a point of time at which it is determined that the start of the engine is requested, and to keep the upper limit of the requested drive amount in a period until the start of the engine is completed.

6. The control apparatus according to claim 1,
wherein the engine-start-request determination portion is configured to determine whether the start of the engine is requested or not, depending on whether a requested drive amount of the vehicle requested by a driver of the vehicle has exceeded an engine-start determination value that is obtained by subtracting a sum of the required starting torque and a margin amount of the outputtable maximum torque from the predicted value of the outputtable maximum torque of the electric motor, and
wherein the margin amount of the outputtable maximum torque is dependent on accuracy of calculation of the predicted value of the rotational speed of the electric motor.

7. The control apparatus according to claim 6,
wherein the engine-start control portion is configured, when it is determined that the start of the engine is requested, to set an upper limit of the requested drive amount, to a sum of the margin amount of the outputtable maximum torque and the engine-start determination value at a point of time at which it is determined that the start of the engine is requested, and to keep the upper limit of the requested drive amount in a period until the start of the engine is completed.

8. A control apparatus for a vehicle that includes (i) an engine, (ii) drive wheels, (iii) an electric motor provided in a power transmission path between the engine and the drive wheels and connected to the engine and the drive wheels in a power transmittable manner, (iv) a clutch provided in the power transmission path, and configured to separate connection between the engine and the electric motor when the clutch is released, and (v) a fluid-type transmission device including a lockup clutch and constituting a part of the power transmission path so as to transmit a drive power of the engine and/or a drive power of the electric motor to the drive wheels,
the control apparatus comprising:
an electric-motor rotational-speed prediction portion that is configured, during motor running of the vehicle by the drive power of the electric motor with the clutch being released, to calculate a predicted value of a rotational speed of the electric motor, by anticipating change of the rotational speed of the electric motor, depending on an operation state of the lockup clutch;
an electric-motor torque prediction portion that is configured to calculate a predicted value of an outputtable maximum torque of the electric motor, by using the predicted value of the rotational speed of the electric motor;
an engine-start-request determination portion that is configured to determine whether start of the engine is requested or not, by using the predicted value of the outputtable maximum torque of the electric motor; and
an engine-start control portion that is configured, when it is determined that the start of the engine is requested, to start the engine by causing the electric motor to output a required starting torque required to start the engine while causing the clutch to be engaged,
wherein the vehicle further includes an electrical storage device configured to supply and receive an electric power to and from the electric motor, and
wherein the electric-motor torque prediction portion is configured to calculate the predicted value of the outputtable maximum torque of the electric motor, based on a limitation of output from the electrical storage device and the predicted value of the rotational speed of the electric motor.

9. The control apparatus according to claim 8,
wherein the electric-motor rotational-speed prediction portion is configured, in a case in which the lockup clutch is in an engaged state, to calculate, as the predicted value of the rotational speed of the electric motor, a sum of an output rotational speed of the fluid-type transmission device and a slip rotational speed of the lockup clutch in process of the start of the engine.

10. The control apparatus according to claim 8,
wherein the engine-start-request determination portion is configured to determine whether the start of the engine is requested or not, depending on whether a requested drive amount of the vehicle requested by a driver of the vehicle has exceeded an engine-start determination value that is obtained by subtracting the required starting torque from the predicted value of the outputtable maximum torque of the electric motor.

11. The control apparatus according to claim 10,
wherein the engine-start control portion is configured, when it is determined that the start of the engine is requested, to set an upper limit of the requested drive amount, to the engine-start determination value at a point of time at which it is determined that the start of the engine is requested, and to keep the upper limit of the requested drive amount in a period until the start of the engine is completed.

12. The control apparatus according to claim 8,
wherein the engine-start-request determination portion is configured to determine whether the start of the engine is requested or not, depending on whether a requested drive amount of the vehicle requested by a driver of the vehicle has exceeded an engine-start determination value that is obtained by subtracting a sum of the required starting torque and a margin amount of the outputtable maximum torque from the predicted value of the outputtable maximum torque of the electric motor, and
wherein the margin amount of the outputtable maximum torque is dependent on accuracy of calculation of the predicted value of the rotational speed of the electric motor.

13. The control apparatus according to claim 12,
wherein the engine-start control portion is configured, when it is determined that the start of the engine is requested, to set an upper limit of the requested drive amount, to a sum of the margin amount of the output-table maximum torque and the engine-start determination value at a point of time at which it is determined that the start of the engine is requested, and to keep the upper limit of the requested drive amount in a period until the start of the engine is completed.

* * * * *